United States Patent Office 3,630,969

Patented Dec. 28, 1971

3,630,969

RESISTOR COMPOSITIONS CONTAINING PYROCHLORE-RELATED OXIDES AND PLATINUM

Michael J. Popowich, Amherst, N.Y., assignor to E. I. du Pont de Nemours and Company, Wilmington, Del.

No Drawing. Filed Oct. 24, 1969, Ser. No. 869,350

Int. Cl. H01b *1/02;* B44d *1/02*

U.S. Cl. 252—514 13 Claims

ABSTRACT OF THE DISCLOSURE

Resistor compositions, which yield, upon firing, smooth resistors having a wide range of resistances, low TCR's and good stability properties, comprising (1) an oxide of the formula $$(M_xBi_{2-x}(M'_yRu_{2-y})O_{7-z}$$

wherein

M is at least one metal selected from the group consisting of yttrium, lanthanum, thallium, indium, cadmium, M' is at least one metal selected from the group consisting of platinum, titanium, tin, chrominum, rhodium, iridium, rhenium, zirconium, antimony and germanium, (2) an inorganic binder, and (3) a required amount of platinum. The control over properties afforded by this combination of ingredients and proportions thereof enhances the significance of this invention.

BACKGROUND OF THE INVENTION

Precious metal resistor compositions containing an inorganic binder have become highly desirable for use in the production of fired electrical resistors. Such resistor compositions and resistors prepared therefrom are, for example, shown in D'Andrea U.S. Pat. 2,924,540 and Dumesnil U.S. Pat. 3,052,573.

Electrical resistors made with these and other prior art compositions possess one or more of the following undesirable properties: high temperature coefficients of resistance, rough surface characteristics, high noise characteristics, a high percentage of drift and poor moisture resistance.

Temperature coefficient of resistance (TCR), generally expressed in parts per million per degree centigrade, is an important characteristic of resistors since changes in temperature will create relatively large changes in resistance when the TCR is high. TCR is generally measured by measuring:

(1) Resistance at room temperature
(2) Resistance at −55° C.
(3) Resistance at 125° C.

Great care is taken to achieve equilibrium at each temperature. The change in resistance is expressed as a function of the room temperature resistance, divided by the temperature increment to give the coefficient.

All of the other above-mentioned properties detract from the overall usefulness of resistors in the electronic field today. Naturally, the elimination of these undesirable properties will conversely produce resistors with highly desirable properties.

Thus, there is a continuing need for resistor compositions which can be fired to produce resistors which do not possess the above-mentioned undesirable properties. In particular, smooth resistors having low TCR's, controllable resistivities and minimal resistivity drift are of great importance in the electronic industry today.

SUMMARY OF THE INVENTION

This invention relates to resistor compositions comprising: (1) 5–90% by weight of an oxide of the formula $$(M_xBi_{2-x}(M'_yRu_{2-y})O_{7-z}$$

wherein

M is at least one metal selected from the group consisting of yttrium, lanthanum, thallium, indium, cadmium, lead and the rare earth metals of atomic number 58–71 inclusive, M' is at least one metal selected from the group consisting of platinum, titanium, tin, chromium, rhodium, iridium, rhenium, zirconium, antimony and germanium, $x$ is a number in the range 0–2, $y$ is a number in the range 0–2, and $z$ is a number in the range 0–1, being at least equal to about $x/2$ when M is a divalent metal, (2) 10–90% by weight of finely divided inorganic binder, and (3) 0.01–10% by weight of a finely divided platinum.

Moreover, such resistor compositions may be dispersed in a liquid vehicle, preferably inert, to provide a resistor paint or paste that can be applied to a surface of a dielectric substrate and fired to form a stable resistor.

DESCRIPTION OF THE PREFERRED EMBODIMENTS

The preferred resistor compositions of this invention comprise 20–80% by weight of BiRuO, 20–80% by weight of a finely divided inorganic binder, and 0.1–8% by weight finely divided platinum.

The essence of this invention lies in the inclusion of a pyrochlore-related oxide and platinum in the resistor compositions and the proportions of oxide, Pt and inorganic binder in the resistor compositions. The ternary bismuth ruthenium oxides, which are disclosed and claimed Bouchard Ser. No. 692,108, filed Dec. 20, 1967, now abandoned (refiled as Ser. No. 880,327, Nov. 26, 1969) and the ternary oxides $Tl_2Ru_2O_7$ and $Tl_2Ir_2O_7$ which are disclosed and claimed in Sleight U.S. Pat. 3,560,144 are incorporated by reference into this specification. The oxides which come within the scope of Ser. No. 692,108, Ser. No. 880,327 and U.S. Pat. 3,560,144 are included in the resistor compositions of this invention. In general, oxides of the formula $(M_xBi_{2-x})(M'_yRu_{2-y})O_{-z}$, where M is at least one metal from the group of yttrium, lanthanum, thallium, indium, cadmium, lead or rare earth metal of atomic number 58–71, inclusive, M' is at least one metal from the group of Pt, Ti, Sn, Cr, Rh, Ir, Re, Zr, Sb or Ge, $x$ is 0–2, $y$ is 0–2 and $z$ is 0–1, being at least equal to about $x/2$ when M is a divalent metal, are operable for purposes of this invention. It is pointed out that the term "an oxide" designates pyrochlore-related oxides, including multisubstituted oxides (e.g., $NdBiRu_2O_7$, $CdPbRu_2O_7$, $CdPbRe_2O_7$) as well as mixtures of said oxides (substituted or unsubstituted). Outstanding among these oxides are $Bi_2Ru_2O_7$ and $Bi_2Ir_2O_7$; they are electrically conductive with low resistivities that are substantially independent of temperature over a wide temperature range. $Bi_2Ru_2O_7$ is also stable on heating in air to at least 1000° C., and its properties are not adversely affected by mild reducing conditions. Consequently, when resistor compositions comprising $Bi_2Ru_2O_7$ and inorganic binder are fired under conventional conditions, the $Bi_2Ru_2O_7$ is essentially unaffected, does not dissociate and remains as an integral part of the fired resistor.

The proportions of the various components are critical and must conform with the prescribed limits. Generally, the resistor compositions must comprise from 5–90% of a pyrochlore-related oxide, 10–90% inorganic binder, and 0.01–10% of platinum. The weight ratios of these components to each other have a significant effect on the resistance and the temperature coefficient of resistance; but in addition, they also have an effect on the smoothness of the fired resistors, moisture stability, noise level and drift. When less than 5% by weight of a pyrochlore-related oxide is used, the ultimate fired resistors have erratic and unreproducible electrical properties. If more than 90% by weight of the oxide is used, the bonding properties of the resistor composition are significantly affected. In most instances, there is insufficient bonding between the individual particles of the ternary oxide which affects the overall stability properties of the ultimate resistor when more than 90% of a pyrochlore-related oxide is present in the resistor composition.

The platinum acts to minimize resistivity drift of the fired resistors, particularly low resistivity resistors which have a greater tendency to drift. The effect of platinum in stabilizing the fired resistors and minimizing room temperature resistivity drift is significant and unexpected. In addition, platinum narrows the TCR spread between hot and cold TCR's. Any small amount of platinum has some effect, but for all practical purposes, at least 0.01% must be present in the resistor compositions. On the other hand, the presence of more than 10% is of no advantage while it increases the cost of the resistor composition. The preferred amount of platinum is within the range of 0.1–8%. The platinum in the resistor composition may be in the form of metallic platinum or compounds which yield platinum under firing conditions.

The resistivity is mainly determined by the amount of inorganic binder present in the resistor compositions. At least 10% by weight inorganic binder must be present to produce the desired resistances in the fired resistors. On the other hand, the use of more than 90% binder produces a wide range of resistances which are too high and erratic for electronic applications.

In addition to the above-mentioned specific effects which each component has on the resistor composition and the fired resistor, each of the components exerts an overall effect on all of the desirable properties. Therefore, each of the individual components and their overall proportions must be considered together as affecting the properties of the resistor compositions and fired resistors made therefrom. The preferred proportions comprise 20–80% by weight of a pyrochlore-related oxide, 20–80% by weight of inorganic binder, and 0.1–8% by weight of platinum.

Other factors which affect the properties of the fired resistor compositions include the particle size and firing temperature. Generally speaking, the finer the components, the lower the resistance. As to the firing temperature, any temperature within the range of 450° C.–950° C. may be used depending on the inorganic binder and substrate material.

Any inorganic material which serves to bind the ternary oxide to the substrate can be used as the inorganic component. The inorganic binder can be any of the glass frits employed in resistor compositions for this general type. Such frits are generally prepared by melting a glass batch composed of the desired metal oxides, or compounds which will produce the glass during melting, and pouring the melt into water. The coarse frit is then milled to a powder of the desired fineness. The patents to Larsen and Short, U.S. Pat. 2,822,279, and to Hoffman, U.S. Pat. 3,207,706, describe some frit compositions which can be employed either alone or in combination with glass wetting agents such as bismuth oxide. Typical frit compositions usable as binders in the compositions of the invention include lead borates, lead silicates, lead borosilicates, cadmium borates, cadmium borosilicate, lead-cadmium borosilicates, zinc borosilicates and sodium-cadmium borosilicates. The term "inorganic binder" includes mixtures of glass frits as well as individual glass frits, with or without wetting agents.

It is well known in the art that the resistivities of resistors are controlled principally by volume percent of conductive phase, rather than weight percent of conductive phase. However, it is convenient in the manufacture of resistor pastes to specify formulae on the basis of weight percent rather than volume percent. For example, an inorganic binder having a significantly different density than the lead borosilicate inorganic binder used herein (in the working examples) will yield useful properties in higher or lower weight percent ranges than the ranges specified for lead borosilicate. Those skilled in the art, knowing the densities of alternate inorganic binders, can calculate appropriate ranges of weight percentages of binder to obtain desirable resistor compositions. Such changes in weight percent are within the scope of this invention. Alternate inorganic binders may be selected in order to better match the coefficient of expansion of the selected substrate. Similarly, an alternate inorganic binder may be selected in order to modify the firing temperature in order to be compatible with processing equipment and/or substrate service temperature.

The resistor compositions of the invention will usually, although not necessarily, be dispersed in an inert vehicle to form a paint or paste for application to various substrates. The proportion of vehicle to resistor composition may vary considerably depending upon the manner in which the paint or paste is to be applied and the kind of vehicle used. Generally, from 1–20 parts by weight of resistor composition (oxides and inorganic binder) per part by weight or vehicle will be used to produce a paint or paste of the desired consistency. Preferably, 2–5 parts per part of vehicle will be used.

Any liquid, preferably inert, may be employed as the vehicle. Water or any one of various organic liquids, with or without thickening and/or stabilizing agents, and/or other common additives, may be utilized as the vehicle. Examples of organic liquids that can be used are the higher alcohols; esters of such alcohols, for example, the acetates and propionates; the terpenes such as pine oil, alpha- and beta-terpineol and the like; and solutions of resins such as the polymethacrylates of lower alcohols, or solutions of ethyl cellulose, in solvents such as pine oil and the monobutyl ether of ethylene glycol monoacetate (butyl-O—$CH_2CH_2$—$OOCH_3$). The vehicle may contain or be composed of volatile liquids to promote fast setting after application; or it may contain waxes, thermoplastic resins or the like materials which are thermofluid so that the vehicle-containing composition may be applied at an elevated temperature to a relatively cold ceramic body upon which the composition sets immediately.

The resistor compositions are conventionally made by admixing the components in their respective proportions. Additionally, one part of vehicle for every 1–20 parts of solids mentioned above may be admixed. Then the resistor composition is applied to a ceramic body and fired to form a stable resistor.

Application of the resistor composition in paint or paste form to the substrate may be effected in any desired manner. It will generally be desired, however, to effect the application in precise pattern form, which can be readily done in applying well-known screen stencil techniques or methods. The resulting print or pattern will then be fired in the usual manner at a temperature from about 450° C.–950° C. in an air atmosphere employing the usual firing furnace.

The invention is illustrated by the following examples. In the examples and elsewhere in the specification, all parts, ratios and percentages of materials or components are by weight.

Various resistor compositions were prepared employing a $Bi_2Ru_2O_7$, inorganic binder, and platinum in finely divided form and varying proportions. The particle sizes of these components ranged from 0.1–5 microns, which are sufficiently finely divided to pass through a 325 mesh (U.S. Standard Sieve Scale) stencil screen. All were suspended in an inert vehicle consisting of 8% ethyl cellulose and 92% beta-terpineol. The inorganic binder was a glass powder consisting of 63% PbO, 26% $SiO_2$, 10% $B_2O_3$ and 1% $Al_2O_3$. In Example 6, the inorganic binder was a mixture containing 97% of the above-described glass and 3% of a Cd glass which consisted of 78% CdO, 9% $B_2O_3$, 9% $SiO_2$, and 4% $Al_2O_3$. The weight ratio of solid resistor composition to vehicle was 3:1 to insure paints having a preferred consistency. The pastes were screen printed onto a 96% dense alumina substrate, onto which platinum-gold alloy patterns had been fired to provide electrical contacts. The substrate with the screen printed composition thereon was fired at 760° C. Adherent resistor layers approximately 0.8 mil thick were formed. The resistivities of the fired resistors were measured at room temperature after 1 hour, 3 hours and 30 hours had elapsed in storage at 25° C. and 150° C. The resistor compositions prepared in this way and fired as described above, along with the resistivities, the percent change in resistivity (percent ΔR), and the TCR's are described below in Table I.

TABLE I

| Example No. | 1 | 2 | 3 | 4 | 5 | 6 | 7 |
|---|---|---|---|---|---|---|---|
| $Bi_2Ru_2O_7$, wt. percent | 73.0 | 72.7 | 72.0 | 65.0 | 70.4 | 70.6 | 73.3 |
| Inorganic binder, wt. percent | 26.7 | 26.6 | 26.7 | 33.1 | 26.6 | 22.5 | 26.7 |
| Platinum, wt. percent | 0.3 | 0.7 | 1.3 | 1.9 | 2.8 | 6.9 | 0 |
| Resistivity, ohms/square. | 16.7 | 15.6 | 14.9 | 23.0 | 14.9 | 9.9 | 15.0 |
| Percent Δ R—1 hr. at 25° C. | 0.02 | 0.02 | 0.01 | 0.01 | 0.01 | 0 | 0.17 |
| Percent Δ R—3 hrs. at 25° C. | 0.04 | 0.03 | 0.01 | 0.01 | 0.01 | 0 | 0.43 |
| Percent Δ R—30 hrs. at 25° C. | 0.05 | 0.03 | 0.02 | 0.02 | 0.01 | 0.01 | 2.43 |
| Percent Δ R—1 hr. at 150° C. | 0.04 | 0.01 | 0.06 | 0.02 | 0.05 | 0.06 | 0.68 |
| Percent Δ R—3 hrs. at 150°C. | 0.05 | 0.01 | 0.06 | 0.02 | 0.05 | 0.12 | 1.27 |
| Percent Δ R—30 hrs. at 150° C. | 0.09 | 0.02 | 0.08 | 0.02 | 0.05 | 0.12 | 2.37 |
| TCR 25 to 125° C., p.p.m./° C. | +165 | +194 | +203 | +199 | +129 | +53 | −27 |
| TCR 25 to −55° C., p.p.m./° C. | −63 | −19 | +3 | +127 | +11 | −64 | −317 |

It can be seen from the tabulated data that the presence of platinum in Examples 1–6 has a significant advantageous effect on the resistance change of fired resistors. The composition of Example 7, which contains no platinum, exhibits a significant resistivity change in 30 hours. When this resistivity change is extended into days, weeks, months, etc., the usefulness of these resistors becomes almost nil. Also, it can be seen that the spread between hot TCR and cold TCR is narrowed by the addition of platinum.

It is pointed out that various additions may be included in the resistor compositions to modify and/or enhance electrical properties. These would include fluxes, wetting agents, other noble metals, etc.

What is claimed is:

1. A resistor composition comprising (1) 5–90% by weight of an oxide of the formula $$(M_xBi_{2-x})(M'_yRu_{2-y})O_{7-z}$$

wherein

M is at least one metal selected from the group consisting of yttrium, lanthanum, thallium, indium, cadmium, lead and the rare earth metals of atomic number 58–71 inclusive, M' is at least one metal selected from the group consisting of platinum, titanium, tin, chromium, rhodium, iridium, rhenium, zirconium, antimony and germanium, $x$ is a number in the range 0–2, $y$ is a number in the range 0–2, and $z$ is a number in the range 0–1, being at least equal to about $x/2$ when M is a divalent metal, (2) 10–90% by weight of finely divided inorganic binder, and (3) 0.01–10% by weight of a finely divided platinum.

2. A resistor composition in accordance with claim 1 which is dispersed in an inert vehicle, said composition being present in an amount of from 1–20 parts by weight per part by weight of inert vehicle.

3. A resistor composition in accordance with claim 1 wherein said ternary oxide is $Bi_2Ru_2O_7$.

4. A resistor composition in accordance with claim 1 wherein said ternary oxide is $Bi_2Ir_2O_7$.

5. A resistor composition comprising 20–80% by weight of $Bi_2Ru_2O_7$, 20–80% by weight of finely divided inorganic binder, and 0.1–8% by weight finely divided platinum.

6. A resistor composition in accordance with claim 5 which is dispersed in an inert vehicle, said composition being present in an amount of from 1–20 parts by weight per part by weight of inert vehicle.

7. A resistor composition comprising 65–75% by weight of $Bi_2Ru_2O_7$, 20–35% by weight of finely divided lead borosilicate glass, 0.25–8% by weight finely divided platinum, and 0–5% of finely divided cadmium borosilicate glass.

8. A method of preparing an electrical resistance element comprising applying the resistor composition of claim 2 onto an electrically nonconductive substrate and firing the coated substrate to a temperature within the range of 450° C.–950° C.

9. An electrical resistance element comprising an electrically nonconductive substrate having fired thereon the resistor composition of claim 1.

10. An electrical resistance element comprising an electrically nonconductive substrate having fired thereon the resistor composition of claim 3.

11. An electrical resistance element comprising an electrically nonconductive substrate having fired thereon the resistor composition of claim 4.

12. An electrical resistance element comprising an electrically nonconductive substrate having fired thereon the resistor composition of claim 5.

13. An electrical resistance element comprising an electrically nonconductive substrate having fired thereon the resistor composition of claim 7.

References Cited

UNITED STATES PATENTS

| | | |
|---|---|---|
| 3,352,797 | 11/1967 | Kim. |
| 3,304,199 | 2/1967 | Faber Sr. et al. |
| 2,739,901 | 3/1956 | Herold et al. |
| 3,329,526 | 4/1967 | Daily et al. |

FOREIGN PATENTS

| | | |
|---|---|---|
| 1,148,926 | 4/1969 | Great Britain. |
| 1,541,456 | 8/1968 | France. |
| 1,903,925 | 1/1969 | Germany. |

OTHER REFERENCES

Van Loan, "A Thick-film Resistor Glaze of Precision Properties," Proceeding 1969 Electronic Components Conference, April 30–May 2, 1969.

DOUGLAS J. DRUMMOND, Primary Examiner

U.S. Cl. X.R.

252—520, 521; 117—221